United States Statutory Invention Registration [19]

[11] Reg. Number: H702

Shively et al. [43] Published: Nov. 7, 1989

[54] CONTROLLING THE MOTION OF A COMPENSATING ROPE IN AN ELEVATOR

[75] Inventors: Gary Shively, Seattle, Wash.; Gordon E. Means, Bloomington, Calif.; Robert Staniec, Monee, Ill.

[73] Assignee: Otis Elevator Company, Farmington, Conn.

[21] Appl. No.: 133,408

[22] Filed: Dec. 15, 1987

[51] Int. Cl.[4] ..... B66B 5/16

[52] U.S. Cl. ..... 187/94; 187/95; 187/1 R; 254/389

[58] Field of Search ..... 187/1 R, 94, 95, 20; 254/389

[56] References Cited

U.S. PATENT DOCUMENTS

| | | | |
|---|---|---|---|
| 3,295,832 | 1/1967 | Fowler | 254/389 |
| 3,882,968 | 5/1975 | Suozzo | 187/94 |
| 4,657,116 | 4/1987 | Gardner et al. | 187/1 R |

FOREIGN PATENT DOCUMENTS

| | | | |
|---|---|---|---|
| 1431966 | 12/1966 | France | 254/389 |
| 221926 | 9/1968 | U.S.S.R. | 187/94 |

*Primary Examiner*—Deborah L. Kyle
*Assistant Examiner*—Michael J. Carone
*Attorney, Agent, or Firm*—John Swiatocha

[57] ABSTRACT

Swaying of a compensating rope (45) in a traction elevator is restrained by a guide means (60, 65 and 85) disposed within the elevator's hoistway (10) to prevent the rope from striking the walls of the hoistway or the elevator car (10).

10 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
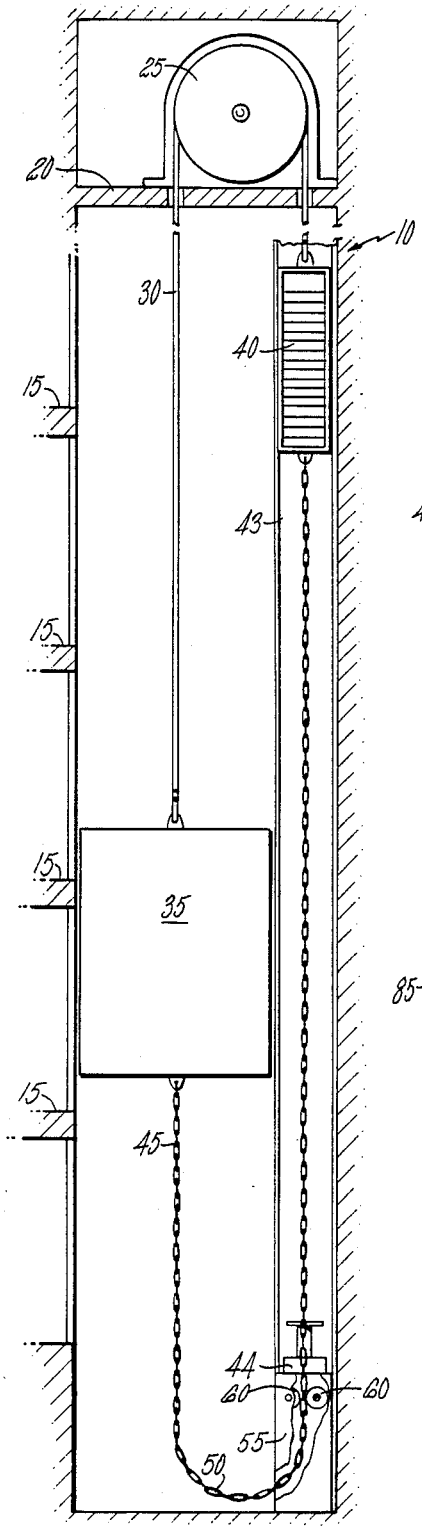
FIG. 2
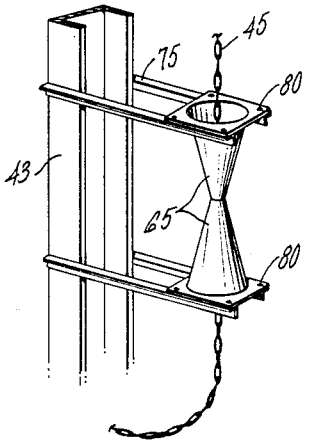
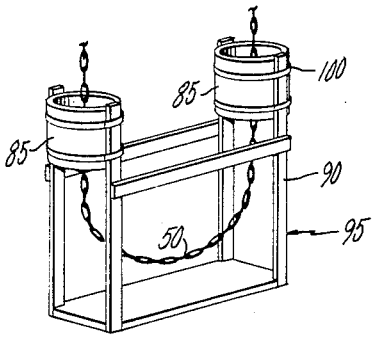
FIG. 3

CONTROLLING THE MOTION OF A COMPENSATING ROPE IN AN ELEVATOR

DESCRIPTION

1. Technical Field

This invention relates generally to elevators and in particular, to controlling the motion of compensating ropes in a traction elevator.

2. Background Art

The elevator car of a typical traction elevator is connected to a counterweight by one or more hoisting ropes which pass over a drive sheave (pulley) disposed at the top of the elevator's hoistway and powered by a drive motor. As the elevator car is pulled up by the hoisting ropes, the counterweight is let down and vice versa, thereby presenting a generally balanced load to the drive motor. Traction elevator systems which exceed a predetermined rise are provided with compensating rope(s) which interconnect the bottom of the elevator car to the bottom of the counterweight, the ropes often forming an open-loop at the bottom of the hoistway. The compensating ropes are of substantially the same weight as the hoisting ropes so that as the elevator car moves from one floor to another, and the hoisting ropes pass from one side of the drive sheave to the other, a substantially equal compensating weight is added to the opposite side of the sheave by the compensating ropes so that the load on both sides of the drive sheave remain substantially constant for all positions of the elevator car within the hoistway.

A compensating rope usually comprises a large chain or heavy steel cable. As a result of internal friction within the chain or cable, steady state longitudinal movement of the compensating rope around the open-loop thereof, results in some back and forth swaying of the rope as the elevator car moves up and down the hoistway. Such swaying is amplified under conditions of car and rope acceleration to such an extent that the swaying can cause a wave to propagate through the compensating rope. Since internal damping in a chain or cable is small, such wave propagation may last can propagate for a number of cycles and can be reinforced by subsequent in-phase waves established in the compensating rope by repeated stops and starts of the elevator car. Such reinforced rope sway can result in the compensating rope striking the car and/or hoistway walls and attendant, objectionable noise resulting therefrom. This problem is compounded by building sway which can approach a foot or more in tall buildings.

While some traction elevator systems have compensating ropes which are tethered by a tie down sheave located at the bottom of the hoistway for maintaining predetermined tension on the compensating rope, a significant number of existing elevator systems such as those described hereinabove wherein the compensating rope is unrestrained at the bottom of the hoistway, currently exhibit the swaying problem discussed herein.

DISCLOSURE OF INVENTION

It is therefore a principal object of the present invention to provide control of the motion of a compensating rope in an elevator system.

It is another object of the present invention to provide such compensating rope control in a manner which is simple, cost effective, and easily adaptable to existing elevators.

In accordance with the present invention, a traction elevator having a compensating rope which defines an open-loop at the bottom of the elevator's hoistway, is provided with guide means disposed within the hoistway in engagement with the rope for laterally restraining the rope, thereby preventing the rope from striking the car or the walls of the hoistway due to dynamic geometrical changes in the rope as the car and counterweight move within the hoistway. The guide means may be of any of a number of shapes such as conical or cylindrical shapes. In a preferred embodiment, the guide means comprises a pair of opposed, open ended, hollow cones which abut at the tips thereof and which receives the compensating rope therewithin. Such cones are conveniently available as ordinary, resilient traffic cones attainable from automotive part suppliers. The cones are attached at the bases thereof to mounting brackets which are in turn readily mounted to the counterweight guide rails.

In another embodiment of the present invention, the guide means may comprise rollers, also conveniently mountable to the counterweight guide rails or cylindrical tubes which receive the compensating rope therewithin at the ends of the looped portion of the rope, and are conveniently mountable within the hoistway on a simple framework which may sit on the elevator's pit floor.

BRIEF DESCRIPTION OF DRAWINGS

FIG. 1 is a sectional, side elevation of a traction elevator employing the present invention for controlling motion of the elevator's compensating rope.

FIG. 2 is an isometric view of an alternate embodiment of the present invention; and FIG. 3 is an isometric view of a second alternate embodiment of the present invention.

BEST MODE FOR CARRYING OUT THE INVENTION AND INDUSTRIAL APPLICABILITY THEREOF

Referring to FIG. 1, a traction elevator hoistway 10 which connects multiple floors 15 in a multi-storied building includes an upper platform 20 which supports drive sheave 25. Sheave 25 is mechanically connected to a drive motor (not shown) and has a hoisting rope 30 passing thereover. Hoisting rope 30 is connected at one end thereof to the top of the elevator car 35 and at the other end thereof to the top of counterweight 40 which rides within guide rails 43. The counterweight is supportable at the bottom of the hoistway by buffers 44 such as that disclosed in U.S. Pat. No. 4,635,907. Car 35 ascends and descends within hoistway 10 with the rotational movement of drive sheave 25 and the resulting longitudinal movement of hoisting rope 30.

The elevator illustrated in FIG. 1 also includes a compensating rope 45 in the form of a chain, although a cable may also be employed. The compensating rope connects at the ends thereof with the bottom of car 35 and counterweight 40 for purposes of balancing the loading on drive sheave 25 from hoisting ropes 30 in the manner described hereinabove. The lowermost portion of the compensating rope 45 describes an untethered open-loop portion 50.

As set forth hereinabove, the steady state and accelerated movements of the car and counterweight can induce reinforced waves within compensating rope 50 which can result in the compensating rope striking the car and hoistway walls, if not controlled. Accordingly, the present invention comprises a guide means for laterally restraining the compensating rope, thereby preventing the rope from striking the car or the walls of the hoistway due to dynamic changes in the geometry of rope 30 from the car and counterweight movement.

Still referring to FIG. 1, the guide means for laterally restraining the compensating rope comprises a bracket 55 fixed to guide rail 43 adjacent the counterweight buffers 44 and having a pair of opposed rollers 60 rotatably mounted thereon. Rollers 60 receive compensating rope 45 and prevent any significant swaying of open-looped portion 50, thereby damping the induction and propagation of any waves in the compensating rope which would otherwise have been created by the swaying of open-looped portion 50. Rollers 60 may be formed from any suitable material, such as a synthetic rubber of the type employed in vehicle tires and the like.

Referring to FIG. 2, the guide means may comprise a pair of opposed, open ended, hollow cones 65 formed from a suitable (preferably resilient) material. As shown, the cones are aligned and abut at the apices thereof and receive the chain therewithin. The cones illustrated include generally planar base portions 70 attached to mounting brackets 75 by any suitable fasteners 80. Mounting brackets 75 are fixed to guide rails 43 by welding, bolting or any other known technique. Cones 65 with integral bases 70 are conveniently available as traffic cones from any of various automobile parts suppliers.

Referring to FIG. 3, the guide means may also comprise tubes 85 mounted to uprights 90 of frame 95 by bands 100. Frame 95 is conveniently supported on the elevator pit floor such that the tubes restrain both lengths of the compensating rope on either side of looped bottom portion 50.

Both cones 65 and tubes 85 may be formed from any of various resilient, synthetic materials such any of various synthetic plastics (urethane and the like). Such materials offer a degree of self-lubricity to the longitudinal movement of the compensating rope therethrough, and also contribute minimally to the noise of the compensating rope moving therethrough. Furthermore, such materials are easily cut, whereby cones and tubes having a continuous lateral surfaces may be conveniently split for purposes of receiving a compensating rope therewithin, without disassembling the rope from the car or counterweight.

It will be appreciated that the compensating rope guides of the present invention effectively restrain the compensating rope from lateral swaying and the accompanying induction and propagation of transverse waves within the rope, resulting from such swaying. This effectively eliminates striking of the car and hoistway wall by the rope. The guides are economically constructed from common, readily available materials and are easily adaptable to existing traction elevators without any disassembly or restructuring thereof.

While specific embodiments of the present invention have been described and illustrated, it will be appreciated that various modifications thereto may be made without departing from the invention and it is intended by the following claims to cover such modifications as fall within the true spirit and scope of this invention.

Having thus described the invention, what is claimed is:

1. In an elevator system comprising an elevator car and a counterweight suspended in a hoistway, and an open-looped, flexible compensating rope connected at the ends thereof to said car and said counterweight, the improvement characterized by:

guide means disposed within said hoistway in engagement with said compensating rope for laterally restraining said rope, thereby preventing said rope from striking said car or the walls of said hoistway due to dynamic changes in the geometry of said loop as said car and counterweight move within said hoistway.

2. The elevator system of claim 1 and further including vertical rails for guiding said counterweight in its movement within said hoistway and characterized by said guide means being fixed to said guide rails.

3. The elevator system of claim 1 characterized by said guide means receiving said compensating rope therewithin and comprising a pair of opposed, open ended, hollow, cones, in mutual abutment at the tips thereof.

4. The elevator system of claim 3 characterized by said cones being formed from a resilient material for damping lateral chain motion.

5. The elevator system of claim 1 characterized by said guide means comprising at least one tube through which said compensating rope is received.

6. The elevator system of claim 5 characterized by said guide means comprising a pair of tubes receiving said rope proximally to said open loop.

7. The elevator system of claim 6 characterized by said tubes being formed from a semi-rigid material.

8. The elevator system of claim 6 characterized by said tubes being supported by a frame from the floor of said hoistway.

9. The elevator system of claim 1 characterized by said guide means comprising at least on roller.

10. The elevator system of claim 1 characterized by said guide means comprising a pair of opposed rollers between which said compensating line is received.

* * * * *